United States Patent [19]

Berghofer

[11] 4,382,819

[45] May 10, 1983

[54] DRAWING AND COLORING ELEMENT IN FORM OF BLACKBOARD-CHALK-LIKE STICK FOR PRODUCING PICTURES THAT CAN BE FIXED THROUGH APPLICATION OF HEAT

[76] Inventor: Theodor Berghofer, Maximilianstr. 14, Wels, Austria

[21] Appl. No.: 102,584

[22] Filed: Dec. 11, 1979

[51] Int. Cl.³ ............................................. C09D 13/00
[52] U.S. Cl. ..................................... 106/19; 106/20; 106/22; 106/23; 427/375; 523/164
[58] Field of Search ........................ 106/19, 20, 22, 23; 428/417; 427/11, 388.1, 393.6, 389.7, 393, 385.5, 375

[56] References Cited

U.S. PATENT DOCUMENTS

| | | | |
|---|---|---|---|
| 2,811,800 | 11/1957 | Gesek | 427/11 |
| 2,962,383 | 11/1960 | Francl et al. | 427/11 |
| 3,834,910 | 9/1974 | Mukai et al. | 106/19 |
| 4,017,451 | 4/1977 | Ishida et al. | 106/19 |

*Primary Examiner*—John Kight, III
*Assistant Examiner*—Amelia B. Yarbrough
*Attorney, Agent, or Firm*—Sheridan Neimark; Karl W. Flocks

[57] ABSTRACT

Drawing and coloring element in the form of blackboard-chalk-like stick for producing pictures that can be fixed on bases through the application of heat.

11 Claims, No Drawings

DRAWING AND COLORING ELEMENT IN FORM OF BLACKBOARD-CHALK-LIKE STICK FOR PRODUCING PICTURES THAT CAN BE FIXED THROUGH APPLICATION OF HEAT

BACKGROUND OF THE INVENTION

The present invention relates to a drawing and coloring element in the form of a drawing stick for producing pictures that can be fixed through the application of heat.

There are already known drawing and/or painting, i.e. coloring elements in the form of sticks having a certain thickness and consisting of extruded chalk and/or gypsum and possibly color-producing pigments. The pictures, inscriptions or drawings made with such chalks cannot be fixed on the base through simple means and in lasting manner. The same is true for the great number of colored pencils available on the market.

Further, it is already known to produce colored patterns on bases, such as ceramic plates, metal plates, etc., through the application of a paste consisting of fusible mineral powders and subsequent heating of the mineral powders to the fused state. Such production takes place in two steps: a surface layer, the so-called base mineral, is first established in the base and only to such surface layer one applies the colored pattern, which is stoved or burned in, with a further firing operation.

These processes require the use of firing temperatures in the range of about 800° C., the use of special, expensive enamel dyes, that frequently do not correspond in their color tone to the color obtained after the firing, or the use of colored top-enamel powders. The preparation of colored patterns in accordance with the enameling process is thus bound to the use of a special and costly kiln for producing the necessary firing temperatures and requires a substantial knowledge of the art, so that one must exclude in advance a general use of such methods, e.g. for the hobby-type production of lasting color patterns or pictures on resistant bases, such as sheet metal, glass, etc.

Further, there are known colored pencils consisting of pigments and synthetic resins. However, owing to the fact that the "lead" consists of a hard fusible element similar to the "leads" used in "lead pencils," such colored pencils cannot be used as drawings or coloring elements in the form of blackboard type chalks for producing in blackboard-chalk fashion pictures that can additionally be fixed on bases through the application of heat.

For example, the Mukai et al U.S. Pat. No. 3,834,910 describes a "pencil lead" based on a powdered coloring agent, a thermoplastic epoxy resin, metal soaps and customary additives, the "lead" being characterized in that it exhibits good strength and hardness, and is formed by melt extrusion of the thermoplastic composition. The mixture consisting of thermoplastic and additives is extruded into "leads" at temperatures of at least 140° C., the "leads" being then processed into pencils of customary degrees of hardness.

Similarly, the Ishida et al, U.S. Pat. No. 4,017,451 discloses the manufacture of a colored pencil lead of great bending strength from a molten mass of thermoplastic novolak resin and coloring agent, as well as optional ingredients such as other thermoplastics, lubricants, etc.

SUMMARY

On the other hand, the object of the present invention is the production of a drawing and coloring element in the form of blackboard-chalk-like stick for the preparation of pictures that can be fixed through the application of heat, which element makes it possible to produce, in customary manner on a base, pictures, inscriptions, drawings and the like, that can then be fixed in lasting manner on the base through the application of temperatures of only up to about 200° C.

DETAILED DESCRIPTION OF EMBODIMENTS

Accordingly, the invention relates to a drawing and coloring element in the form of blackboard-chalk-like stick for the preparation of pictures that can be fixed through the application of heat, consisting of a fixing-effective amount of a binder, made of at least one fusible thermosettable synthetic resin, and a coloring-effective amount of at least one inorganic and/or organic color-producing pigment and possibly dyes soluble in the synthetic resin, as well as additives customary in the thermal processing of thermoplastic or thermosetting synthetic resins. Such stick is characterized in that it comprises a mixture of powder-type components cold consolidated or solidified through application of pressure below the respective fusing and hardening temperatures of the thermosettable resin to provide a chalky, friable, and relatively brittle product, the color-producing pigment being present in the mixture in an amount of 5-50% by weight in relation to the total amount of the resin-type binder and pigment.

As binder, there may be used uncured epoxy, polyester, polyurethane or acrylic resins, or compatible mixtures thereof. The drawing and coloring element preferably contains as the binder an uncured epoxy resin and an uncured polyester resin in a weight ratio of 0.5:1 to 1.5:1. preferably 1:1.

The drawing and coloring element can be produced by forming a mixture of the above-mentioned components and pressing it under or with increased pressure at room temperature. The procedure is preferably such that the mixture of components is processed in an extrusion press, cooled, crushed and comminuted to a fine particle size, of preferably at most 60μ. The pulverulent mixture of components thus obtained is then pressed at room temperature and under a pressure sufficient to consolidate the powder, e.g. 90 bar, into drawing or coloring elements of chalky and friable consistency. The separate drawing and coloring elements may also be cut from a pre-pressed block.

The pressed blanks thus obtained are then preferably provided with a surface layer of lacquer, which increases their solidity and largely prevents any soiling of fingers. In place of the lacquer layer or in addition thereto, one may provide a foil-type cover, such as aluminum foil, or paper, wood and the like.

The drawing and coloring element in the form of blackboard-chalk stick may contain flow-promoting agents, fillers, extenders and other additives customary in the thermal processing of thermoplastic or thermosetting synthetic resins.

As mentioned above, the drawing and coloring element of the invention can be used for making pictures and the like, that are then fixed permanently through the application of heat which causes curing or hardening of the resin mixture. The pictures and the like may be made on any base which is stable during the thermal treatment. Examples of such bases are sheet-metal plates, stoneware, glass, wood, synthetic resins, etc.

When the base possesses a good thermal conductivity, it is sufficient to heat the base from below for the purpose of fixing the applied colored pattern thereto, until the applied material adheres to the base and/or (if a thermosettable synthetic resin is present together with a hardener) until it hardens, which ordinarily takes place in a few minutes.

Other materials possessing a poor thermal conductivity may after the application of the drawing be heated from above or in an oven. The temperature depends on the fusing or hardening temperature of the synthetic resin and is ordinarily situated in the range of 50°–300° C. Accordingly, the fixing of pictures may also be performed on a hot plate, a kitchen baking oven or the like.

As it follows from the above statements, the drawing and coloring element of the invention enables the user to produce, e.g., pictures or drawings in the manner customary in the use of chalks and to fix such pictures or drawings firmly and permanently in the shortest possible time and in the most simple manner, so that one obtains an enamel-type product resistant to impacts. The pictures prepared with the drawing and coloring elements of the invention and fixed by setting the binder are weather resistant and largely stable in regard to the corroding action of chemicals and solvents; besides, the surface of the pictures possesses a considerable mechanical strength. The pictures and the like produced quickly and simply with the drawing and coloring elements of the invention may be displayed also in extremely exposed positions, on account of all such advantageous properties.

The invention is explained more in detail through the following examples:

EXAMPLE 1

The following raw materials

| | |
|---|---|
| high-molecular, acid-group containing polyester resin (M.W. 3200; softening point 95–121° C.; sp.wt. 1.19 g/cm$^3$) | 54 parts by weight |
| triglycidylisocyanurate (M.W. 300; M.P. 94° C. ± 3° C.; sp.wt. 1.46 g/cm$^3$) | 7 parts by weight |
| flow-promoting agent (polyacrylic acid-n-butyl ester; sp.wt. 1.05 g/cm$^3$) | 1 part by weight |
| titanium dioxide | 5 parts by weight |
| diazo red pigment (color index pigment red 166; sp.wt. 1.49 g/cm$^3$) | 6 parts by weight | are premixed for about 10 minutes in a tumbler and extruded in an extruder at a temperature of about 130° C. and a time of stay of about 1 minute. After cooling, the material is ground in a mill to a grain size of at most 60 μm and the powder is then sieved on a screen. Thereafter, the powder is cold pressed in a press at about 90 kp/cm$^2$ into coloring and drawing elements in the form of blackboard-type-chalk sticks.

According to a variant, the raw materials present in powder form may be premixed and directly pressed in a press at about 90 kp/cm$^2$ into coloring and drawing elements in the form of blackboard-chalk sticks.

EXAMPLE 2

The following raw materials

| | |
|---|---|
| epoxy resin, bisphenol A-base, epichlorohydrin type 1004 (wt. average M.W. 4000; mean M.W. 1200; M.P. 69–75° C.; sp.wt. 1.19 g/cm$^3$) | 32 parts by weight |
| high-molecular, acid-group containing polyester resin (M.W. 3200; softening pt. 100–120° C.; sp.wt. 1.19 g/cm$^3$) | 32 parts by weight |
| flow-promoting agent (polyacrylic acid-n-butylester; sp.wt. 1.05 g/cm$^3$) | 1 part by weight |
| titanium dioxide | 10 parts by weight |
| copper phthalocyanine β-modification (color index pigment blue 15/No. 74160; M.W. 576.3; sp.wt. 1.62 g/cm$^3$) | 3 parts by weight | are premixed for about 10 minutes in a tumbler and extruded in an extruder at a temperature of about 125° C. and a time of stay of about 1 minute. After cooling, the material is comminuted in a mill to a grain size of at most 60 μm and the powder is then sieved on a screen. Thereafter, the powder is cold pressed in a press at about 90 kp/cm$^2$ into coloring and drawing elements in the form of blackboard-type-chalk sticks.

According to a variant, the raw materials present in powder form may be premixed and directly pressed in a press at about 90 kp/cm$^2$ into coloring and drawing elements in the form of blackboard-type-chalk sticks.

EXAMPLE 3

The following raw materials

| | |
|---|---|
| epoxy resin, bisphenol A-base, epichlorohydrin, type 1004 (wt. ave. M.W. 4000; mean M.W. 1200; M.P. 69–75° C.; sp.wt. 1.19 g/cm$^3$) | 50 parts by weight |
| dicyandiamide derivative-epoxy hardener (tolyl-xylyl-biguamide; M.W. 210; M.P. 100–120° C.) | 1.9 parts by weight |
| flow-promoting agent (polyacrylic acid-n-butyl ester; sp.wt. 1.05 g/cm$^3$) | 1 part by weight |
| titanium dioxide | 10 parts by weight |
| chlorinated copper phthalocyanine (color index pigment green 7/No. 74260; M.W. 271.7; sp.wt. 2.13 g/cm$^3$) | 3 parts by weight | are premixed for about 10 minutes in a tumbler and extruded from an extruder at a temperature of about 100° C. and a time stay of about 1 minute. After cooling, the material is ground in a mill to a grain size of at most 60 μm and the powder is then sieved on a screen. Thereafter, the powder is cold pressed in a press at about 90 kp/cm$^2$ into coloring and drawing elements in the form of blackboard-chalk-like sticks.

According to a variant, the raw materials present in the form of powder may be premixed and directly pressed in a press at about 90 kp/cm$^2$ into coloring and drawing elements in the form of blackboard-chalk-like sticks.

EXAMPLE 4

Polyurethane base chalk-like sticks:

The following materials were mixed:

| | |
|---|---|
| isocyanate (Adukt B 1065) | 14.0 weight % |
| polyester (Crelan U 502) | 42.0 weight % |
| flow improver (polyacryl, i.e. and ester: Acronal 4F) | 1.0 weight % |
| titanium dioxide | 37.5 weight % |
| organic dye (irgalite yellow 2GF) | 3.5 weight % |

Adukt B 1065:
Composition: blocked isophorone diisocyanate
Melting point: 70–78° C.
Specific weight: about 1.13 g/cm$^3$ -continued Crelan U 502:
Composition: oil-free polyester based on
terephtalic acid
Softening point: about 15° C.
specific weight: about 1.05 g/cm³
Irgalite Yellow 2 GF:
Composition: diarylide-o-anisidide, pigment
yellow 17
Specific weight: 1.36 g/cm³

This formulation was processed as indicated in the preceding examples to produce a yellow drawing element in the form of a blackboard-chalk-like stick.

EXAMPLE 5

Acrylic base chalk-like sticks:

The following materials were mixed:

| | |
|---|---|
| Acrylic resin (VP-LM 36/41) | 71.5 weight % |
| sebacic acid | 8.5 weight % |
| epoxy resin (Araldit GT 6071) | 2.0 weight % |
| titanium dioxide | 11.0 weight % |
| copper phthalocyanine (heliogen green 87212) | 2.0 weight % |
| organic dye (Irgalite yellow 2 GF) | 5.0 weight % |

VP-LM 36/41:
Composition: (meth)acrylic resin containing epoxide groups
and capable of linking with polycarboxylic acid
molecular weight: about 20,000
melting point: 70–80° C.
specific weight: 1.1 g/cm³
Araldit GT 6071:
Composition: epoxide resin based on bisphenol A and
epichlorohydrin
molecular weight: about 4,000
melting point: about 50° C.
specific weight: about 1.2 g/cm³
Heliogen Green 87212:
Composition: chlorinated copper phthalocyanine pigment
green 7 No. 74260
molecular weight: 271.7
specific weight: 2.13 g/cm³

This formulation was processed as in the preceding example to produce a chalky, friable drawing stick.

The bending strength of the drawing and coloring elements obtained in the foregoing examples was determined according to the method of JIS S-6005-1971. This strength-measuring method is conducted as follows:

The drawing and coloring element in the form of blackboard-chalk-like stick having a square cross-section of 10×10 mm is laid at the central point between the two supporting points. The concentrated minimum load that can break the stick is measured and the flexural strength is calculated by the following formula:

$$f = \frac{BPL}{xd^2}$$

wherein f designates the bending strength (g/mm²), P stands for the minimum concentrated load (g) on the center that can break the load, L indicates the distance (mm) between the two supporting points (usually adjusted to 60 mm), and d designates the diameter of the stick.

The results are reported in the following Table

| Example | bending strength (g/mm²) |
|---|---|
| 1 | 64.8 |
| 2 | 60.5 |
| 3 | 49.8 |
| 4 | 52.3 |
| 5 | 58.2 |

It will be obvious to those skilled in the art that various changes may be made without departing from the scope of the invention and the invention is not to be considered limited to what is described in the specification.

What is claimed is:

1. In a drawing and coloring element in the form of a stick for producing pictures on a substrate, consisting of a fixing-effective amount of a binder made of at least one initially fusible synthetic resin which is thermoplastic or thermosetting and which is selected from the group consisting of an acrylic resin, epoxy resin, polyester resin, polyurethane resin and mixtures thereof, and a coloring-effective amount of at least one inorganic color-producing pigment, organic color-producing pigment or mixture thereof and optionally dyes soluble in the synthetic resin, as well as additives customary in the thermal processing of thermoplastic or thermosetting synthetic resins, the improvement wherein the drawing and coloring element is a friable and chalk-like stick consisting of a compacted mixture of powdered components cold consolidated in a press through application of pressure below the fusing or hardening temperature of said resin, said color-producing pigment being present in such mixture in an amount of 5–50% by weight in relation to the total amount of the resin-type binder and said pigment.

2. A drawing and coloring element as in claim 1, characterized in that it contains as binder an epoxy resin and a polyester resin in a weight ratio of 0.5:1 to 1.5:1, preferably 1:1.

3. A friable, chalk-like drawing and coloring stick for producing pictures on a substrate which pictures can be fixed and hardened on the substrate through the application of heat, comprising a binder of at least one fusible thermosettable synthetic resin in powder form selected from the group consisting of an acrylic resin, epoxy resin, polyester resin, polyurethane resin and mixtures thereof, and at least one color-producing pigment in powder form, said pigment being present in a coloring-effective amount comprising 5–50% by weight of the total amount of said synthetic resin binder and said pigment;

said powdered resin binder and said powdered color producing pigment being consolidated by cold pressing in a press through the application of pressure below the fusing and hardening temperature of said resin.

4. A drawing and coloring element in stick form in accordance with claim 3, wherein said synthetic resin comprises a mixture of approximately equal amounts of epoxy resin and polyester resin.

5. A method of making a chalk type stick for drawing and coloring to produce pictures of a permanent nature by the application of heat, comprising mixing at least one fusible thermosettable synthetic resin in powder form with a coloring pigment in powder form, the relative quantities thereof being 5-50% by weight pigment and 95-50% by weight thermosettable resin; forming said powder mixture into a stick by cold pressing in a press under pressure on the order of about 90 kp/cm$^2$ and at a temperature below the fusing and hardening temperature of said thermosettable resin.

6. The new use of a drawing and coloring element in accordance with claim 1, comprising using said element to form a picture on a heat resistant substrate, and applying sufficient heat to said substrate to effect fusion and setting of said resin.

7. A drawing and coloring element as in claim 1, wherein the binder is an acrylic resin, a polyurethane resin, or a mixture of acrylic resin and epoxy resin.

8. A drawing and coloring element as in claim 3, wherein the binder is an acrylic resin, a polyurethane resin, or a mixture of acrylic resin and epoxy resin.

9. A method according to claim 5, wherein said resin is an acrylic resin, a polyurethane resin, or a mixture of acrylic resin and epoxy resin.

10. A method according to claim 5, wherein said cold pressing is carried out at a temperature not substantially greater than room temperature.

11. A method according to claim 5 wherein said powder mixture, prior to cold pressing thereof, is formed by extruding said at least one fusible thermo settable synthetic resin with said coloring pigment into a solid product, followed by crushing said extruded solid product to powder form.

* * * * *